US010562582B2

(12) United States Patent
Mizuno et al.

(10) Patent No.: US 10,562,582 B2
(45) Date of Patent: Feb. 18, 2020

(54) OPTICAL SENSOR DISPOSITION STRUCTURE FOR SADDLE RIDING VEHICLE

(71) Applicant: HONDA MOTOR CO., LTD., Tokyo (JP)

(72) Inventors: Kunihiro Mizuno, Niiza (JP); Takeshi Konno, Iruma (JP); Kazuyuki Maruyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 204 days.

(21) Appl. No.: 15/591,748

(22) Filed: May 10, 2017

(65) Prior Publication Data

US 2017/0327177 A1 Nov. 16, 2017

(30) Foreign Application Priority Data

May 13, 2016 (JP) ................................. 2016-097420

(51) Int. Cl.
*H04N 5/00* (2011.01)
*B62K 11/14* (2006.01)
(Continued)

(52) U.S. Cl.
CPC ............... *B62K 11/14* (2013.01); *B62J 99/00* (2013.01); *B62K 11/04* (2013.01); *B62K 23/02* (2013.01); *H04N 5/2252* (2013.01); *H04N 5/2253* (2013.01); *H04N 5/2254* (2013.01); *H04N 7/181* (2013.01); *B62J 2099/002* (2013.01); *B62K 2207/00* (2013.01)

(58) Field of Classification Search
CPC .... B60Q 9/00; B60Q 9/008; B62J 6/00; B62J 27/00; B62J 99/00; B62J 2099/004; B62J 2099/0033; H04N 5/77; H04N 5/772; H04N 5/907
See application file for complete search history.

(56) References Cited

U.S. PATENT DOCUMENTS 4,854,702 A * 8/1989 Stieff ................... G01B 11/275
356/155
6,134,792 A * 10/2000 January ............. G01B 11/2755
33/203.18
(Continued)

FOREIGN PATENT DOCUMENTS

DE 20319228 U1 3/2004
EP 2990320 A1 3/2016
(Continued)

OTHER PUBLICATIONS

Extended European Search Report, dated Oct. 10, 2017, for European Application No. 17170244.2.
(Continued)

*Primary Examiner* — Frank F Huang
(74) *Attorney, Agent, or Firm* — Birch, Stewart, Kolasch & Birch, LLP

(57) ABSTRACT

An optical sensor disposition structure of a saddle riding vehicle includes an optical sensor, left and right handle bar grips installed on both side portions of a handle bar pipe, and a switch case installed between the left and right handle bar grips and supported by the handle bar pipe, and the optical sensor is installed on the switch case.

16 Claims, 11 Drawing Sheets

(51) Int. Cl.

| | |
|---|---|
| ***B62K 11/04*** | (2006.01) |
| ***B62K 23/02*** | (2006.01) |
| ***B62J 99/00*** | (2020.01) |
| ***H04N 5/225*** | (2006.01) |
| ***H04N 7/18*** | (2006.01) |

(56) References Cited

U.S. PATENT DOCUMENTS

| | | | | |
|---|---|---|---|---|
| 2002/0167589 | A1* | 11/2002 | Schofield | B60N 2/002 348/148 |
| 2004/0039544 | A1* | 2/2004 | Merrill | G01B 11/275 702/147 |
| 2004/0190302 | A1* | 9/2004 | Mascadri | B62J 6/16 362/474 |
| 2005/0270373 | A1* | 12/2005 | Trela | H04N 7/18 348/143 |
| 2006/0132602 | A1* | 6/2006 | Muto | H04N 7/18 348/148 |
| 2006/0152711 | A1* | 7/2006 | Dale, Jr. | G01B 11/2755 356/139.09 |
| 2007/0040911 | A1* | 2/2007 | Riley | H04N 7/181 348/148 |
| 2008/0211914 | A1* | 9/2008 | Herrera | H04N 7/18 348/148 |
| 2010/0079266 | A1* | 4/2010 | Holt | B60Q 1/52 340/425.5 |
| 2010/0196000 | A1 | 8/2010 | Watanabe | |
| 2014/0236514 | A1* | 8/2014 | Icove | G01V 3/081 702/65 |
| 2016/0129962 | A1* | 5/2016 | Langevin | B62J 27/00 386/226 |

FOREIGN PATENT DOCUMENTS

| | | | |
|---|---|---|---|
| JP | 61-162777 | A | 7/1986 |
| JP | 2006-103600 | A | 4/2006 |
| JP | 2010-173540 | A | 8/2010 |
| JP | 2011-31819 | A | 2/2011 |
| JP | 2013-6466 | A | 1/2013 |
| JP | 2013-164869 | A | 8/2013 |
| JP | 2013-203170 | A | 10/2013 |
| JP | 2014-193696 | A | 10/2014 |
| JP | 3194330 | U | 11/2014 |

OTHER PUBLICATIONS

Japanese Office Action and English translation, dated Oct. 24, 2017, for Japanese Application No. 2016-097420.

European Office Action, dated Jan. 18, 2019, for European Application No. 17170244.2.

Japanese Decision of Rejection, dated Dec. 18, 2018, for Japanese Application No. 2016-097420, with English translation.

* cited by examiner

OPTICAL SENSOR DISPOSITION STRUCTURE FOR SADDLE RIDING VEHICLE

CROSS-REFERENCE TO RELATED APPLICATION

Priority is claimed on Japanese Patent Application No. 2016-097420, filed May 13, 2016, the contents of which are incorporated herein by reference.

BACKGROUND

Field of the Invention

The present invention relates to an optical sensor disposition structure for a saddle riding vehicle.

Description of Related Art

For example, Japanese Unexamined Patent Application, First Publication No. 2013-203170 discloses an optical sensor disposition structure for a saddle riding vehicle of the related art. This is a structure in which a portable information terminal device including a camera is fixed to a handle bar.

SUMMARY

However, since a separate stay configured to support the portable information terminal device needs to be fixed to a handle bar, there was a possibility that a reduction in size of a periphery of the handle bar cannot be obtained.

An aspect of the present invention is directed to reduce a size of a periphery of a handle bar in an optical sensor disposition structure for a saddle riding vehicle.

An optical sensor disposition structure for a saddle riding vehicle according to the present invention employs the following configurations.

(1) An optical sensor disposition structure for a saddle riding vehicle including a handle bar according to an aspect of the present invention includes an optical sensor; left and right handle bar grips installed on both side portions of the handle bar; and a switch case installed between the left and right handle bar grips and supported by the handle bar, wherein the optical sensor is installed at the switch case.

(2) In the aspect of (1), the optical sensor may include a main body section installed inside the switch case; and a lens attached to the main body section and exposed toward an outside of the switch case.

(3) In the aspect of (1) or (2), the optical sensor may be installed above the handle bar.

(4) In the aspect of any one of (1) to (3), when seen in a rear view, a shaft section switch may be installed at a position overlapping an axis of the handle bar, and the optical sensor may be installed above the shaft section switch.

(5) In the aspect of any one of (1) to (4), when seen in a rear view, an upper switch may be installed at an upper section of the switch case, and the optical sensor may be installed more inward than the upper switch in a vehicle width direction.

According to the aspect of (1), as the optical sensors are installed on the switch cases, since a separate stay does not need to be fixed to the handle bar, a periphery of the handle bar can be reduced in size. In addition, in comparison with the case in which a separate stay is installed, the appearance can be improved.

In addition, while harnesses connected to the optical sensors are necessary, in comparison with the case in which the optical sensors are installed on a separate stay, a routing distance of the harnesses can be reduced.

In addition, since the harnesses of the optical sensors can be integrated with other harnesses of the switch cases, the appearance can be improved.

In addition, when the optical sensor and the switch case have substantially the same color (for example, black), since the optical sensor is inconspicuous, the appearance can be improved.

In addition, in comparison with a case in which a portable information terminal device having a built-in camera is installed, since a dead angle does not occur in a field of vision of an occupant due to the portable information terminal device, the meter can be prevented from being inconspicuous.

In addition, since a dead angle does not occur in a detection region of the optical sensor due to vehicle parts such as a meter, a headlight, and so on, a detectable range of the optical sensor can be prevented from being restricted.

According to the aspect of (2), as the optical sensor includes the main body section installed inside the switch case and the lens or antenna attached to the main body section and exposed to the outside of the switch case, since the optical sensor can be used even when raining, usability can be improved. In addition, since the main body section of the optical sensor becomes inconspicuous, the appearance can be improved.

According to the aspect of (3), as the optical sensor is installed above the handle bar, occurrence of a dead angle in the detection region of the optical sensor due to members around the handle bar can be minimized. Accordingly, the detection region of the optical sensor can be maintained.

According to the aspect of (4), since the optical sensor is installed above the shaft section switch, even when an occupant operates the shaft section switch, blocking of the detection region of the optical sensor by the occupant's hands can be minimized. Accordingly, the detection region of the optical sensor can be maintained.

According to the aspect of (5), as the optical sensor is installed more inward than the upper switch in the vehicle width direction, even when the occupant manipulates the upper switch, the detection region of the optical sensor can be suppressed from being blocked by the occupant's hands. Accordingly, the detection region of the optical sensor can be secured. In addition, in comparison with a case in which the optical sensor is installed more outward than the upper switch in the vehicle width direction, a routing distance of the harness connected to the optical sensor can be reduced.

DESCRIPTION OF EMBODIMENTS

Figure 1:
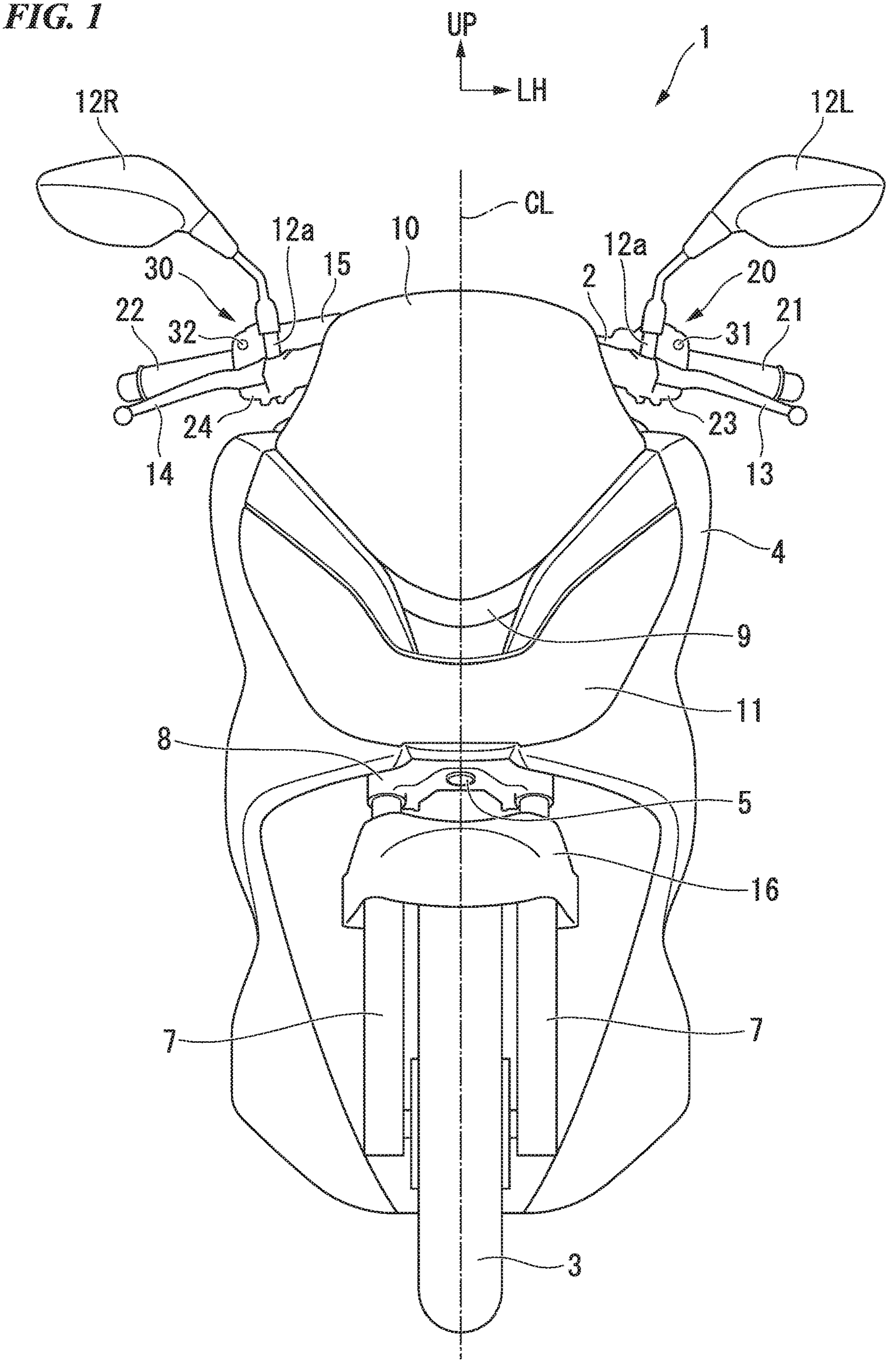
FIG. 1 is a front view of a motorcycle according to an embodiment.

Hereinafter, an embodiment of the present invention will be described based on the accompanying drawings. Further, directions of forward, rearward, left, right, and so on, described below are the same as directions in a vehicle described below unless the context clearly indicates otherwise. In addition, in appropriate places in the drawings used in the following description, an arrow FR showing a forward direction with respect to a vehicle, an arrow LH showing a leftward direction with respect to the vehicle and an arrow UP showing an upward direction with respect to the vehicle are provided.

FIG. 1 shows a scooter type motorcycle 1 serving as an example of a saddle riding vehicle. Hereinafter, the motorcycle 1 may be simply referred to as "a vehicle."

<Entire Vehicle>

As shown in FIG. 1, the motorcycle 1 includes steering system parts including a handle bar pipe 2 (handle bar) and a front wheel 3 supported at a head pipe of a front end of a vehicle body frame (not shown) to be steerable, a front cowl 4 configured to cover a vehicle body front section, and an optical sensor disposition structure 20, which will be described below.

Figure 11:
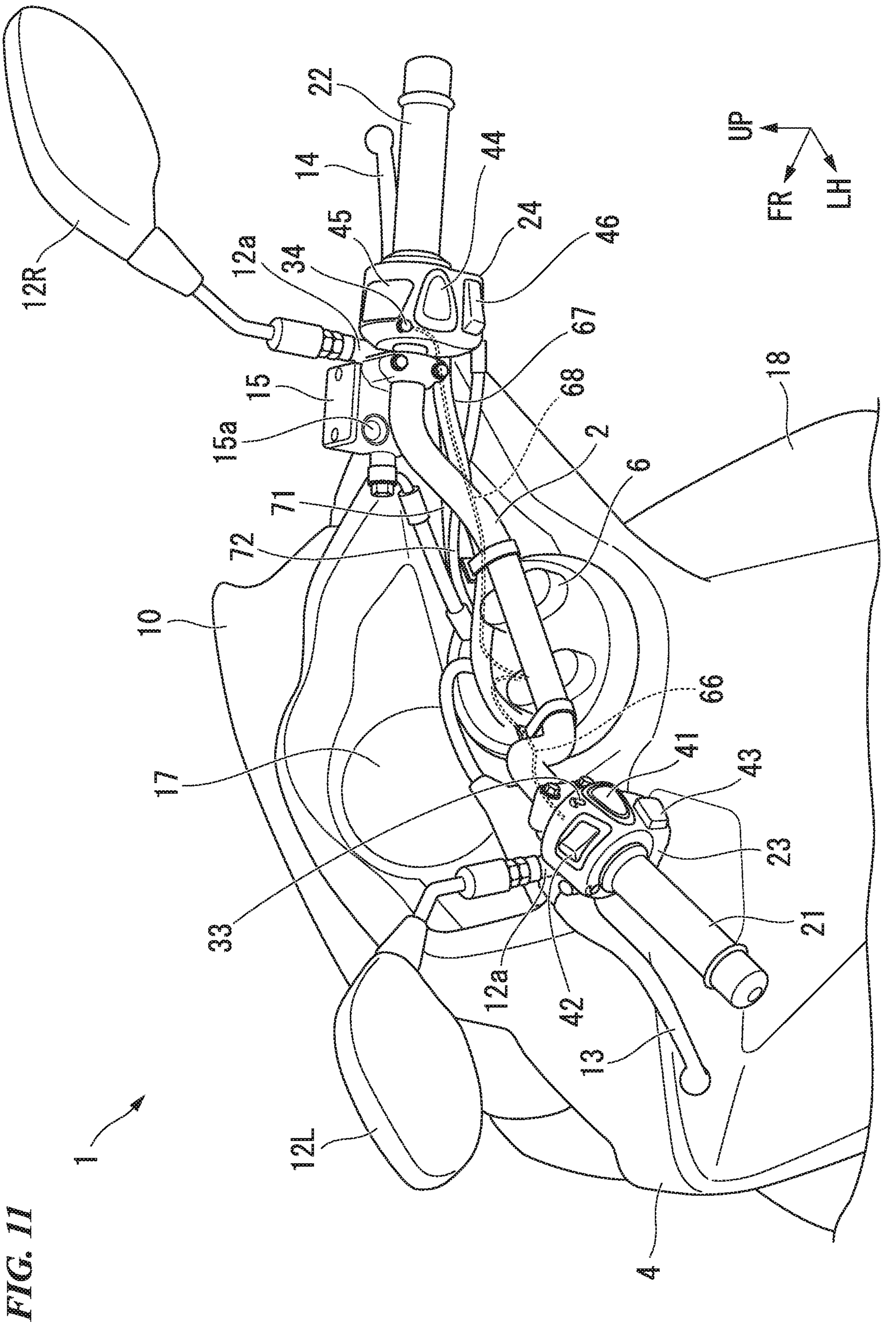
FIG. 11 is a perspective view of the optical sensor disposition structure according to the embodiment when seen from a left rear side.

The handle bar pipe 2 is supported at an upper end portion of a steering shaft 5 inserted through a head pipe (not shown) via a handle bar holder 6 (see FIG. 11).

The front wheel 3 is axially supported at lower end portions of a pair of left and right front forks 7.

A bridge member 8 extending in a vehicle width direction is connected to a lower end portion of the steering shaft 5 exposed from the head pipe.

Upper end portions of the left and right front forks 7 are respectively connected to left and right sides of the bridge member 8.

The front cowl 4 covers a front upper section of a vehicle body frame from a front side toward the both of left and right sides.

A garnish 9 having an introduction port configured to guide traveling air rearward, a meter visor 10 disposed above the garnish 9 and a headlight 11 disposed below the garnish 9 are attached to the front cowl 4.

When seen in a front view, the headlight 11 is formed in a U shape having an upper edge formed along a lower edge of the garnish 9.

Further, reference numeral 12 in the drawings designates a pair of left and right rearview mirrors, reference numeral 13 in the drawings designates a clutch lever, reference numeral 14 in the drawings designates a brake lever, reference numeral 15 in the drawings designates a reservoir tank of a brake master cylinder, and reference numeral 16 in the drawings designates a front fender.

<Optical Sensor Disposition Structure>

Figure 2:
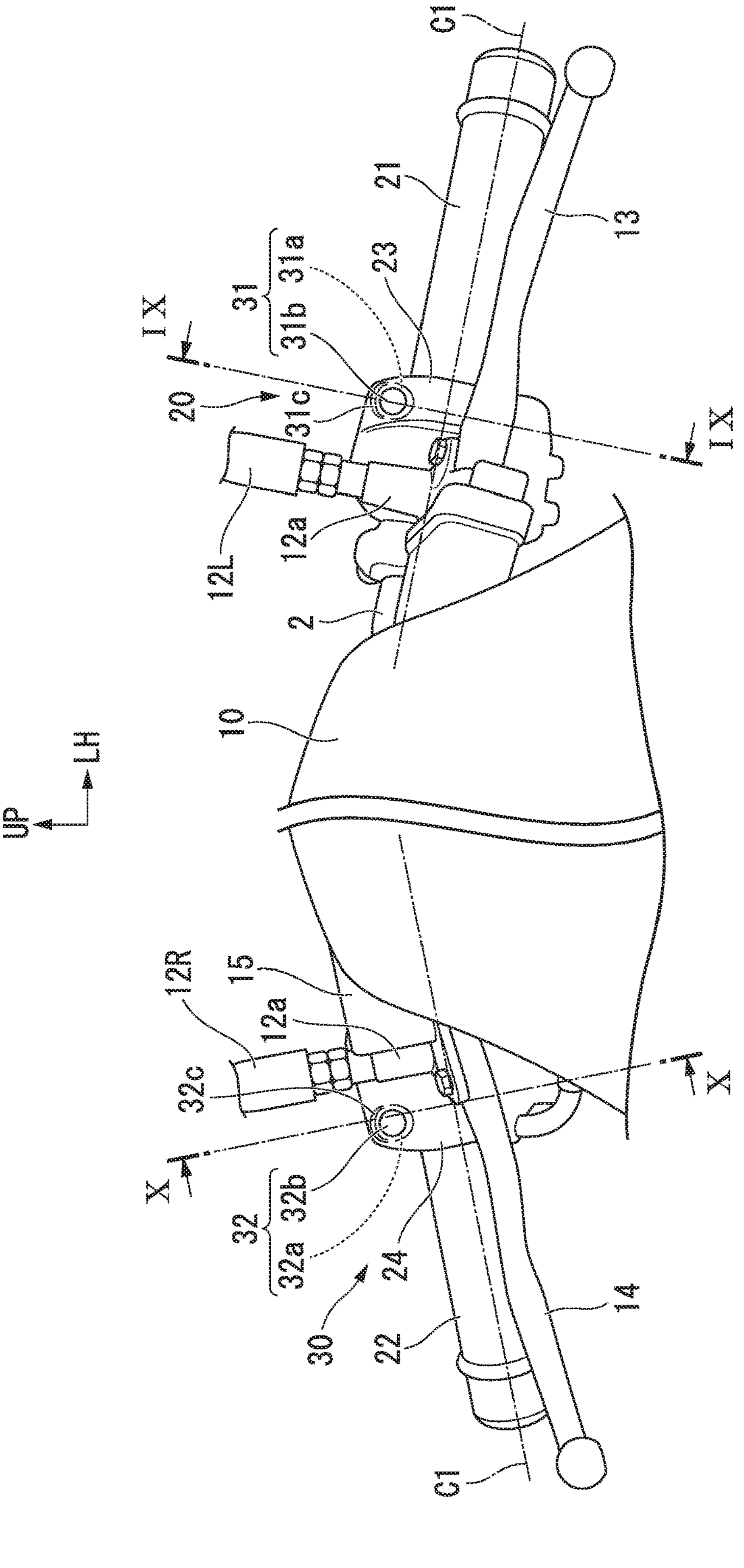
FIG. 2 is a front view of an optical sensor disposition structure according to the embodiment.

FIG. 2 shows a camera disposition structure including cameras that can photograph objects or the like around the vehicle as an example of the optical sensor disposition structure 20.

As shown in FIG. 2, the optical sensor disposition structure 20 includes cameras 31 and 32 (optical sensors) disposed on a vehicle body front section, left and right handle bar grips 21 and 22 installed on both side portions of the handle bar pipe 2, and left and right switch cases 23 and 24 installed between the left and right handle bar grips 21 and 22 and supported by the handle bar pipe 2.

When seen in a front view of FIG. 2, the left and right handle bar grips 21 and 22 have tubular shapes and are inclined so that the more outward part in the vehicle width direction is disposed at more downward position.

The left and right switch cases 23 and 24 are respectively disposed on rear sides of support stays 12*a* configured to respectively support left and right rearview mirrors 12L and 12R.

<Camera>

The motorcycle 1 includes a driving support system 30 using a camera. The driving support system 30 includes left and right front-photographing cameras 31 and 32 (see FIG. 2), left and right rear-photographing cameras 33 and 34 (see FIG. 4), and left and right lateral-photographing cameras 35 and 36 (see FIG. 6 and FIG. 7). Hereinafter, the left and right front-photographing cameras, the left and right rear-photographing cameras, and the left and right lateral-photographing cameras may be simply referred to as "cameras."

The cameras 31, 32, 33, 34, 35 and 36 output captured images to an image processor in a control device (not shown) of the driving support system 30.

Based on the images photographed by the cameras 31, 32, 33, 34, 35 and 36, the image processor performs recognition of objects and the like including other vehicles in front of the vehicle, behind the vehicle and at sides of the vehicle, calculation of a distance between the object and the vehicle, and so on. Further, the image processor may perform correction for the output image information based on a handle bar steering angle, a bank angle, and so on.

The image processor outputs processing information to a command section of the control device. The command section outputs commands for performing driving support such as brake control, steering control, and so on, to prevent collision of the vehicle, various warnings to an occupant, and so on, to respective parts of the vehicle. Further, the driving support system 30 may be linked to a navigation system and a cruise control system. The cameras 31, 32, 33, 34, 35 and 36 may also be used in a drive recorder.

The cameras 31, 32, 33, 34, 35 and 36 are installed on the switch cases 23 and 24. The cameras 31, 32, 33, 34, 35 and 36 respectively include camera main bodies 31*a*, 32*a*, 33*a*, 34*a*, 35*a* and 36*a* (main body sections) installed inside the switch cases 23 and 24, and lenses 31*b*, 32*b*, 33*b*, 34*b*, 35*b* and 36*b* attached to the camera main bodies 31*a*, 32*a*, 33*a*, 34*a*, 35*a* and 36*a* and exposed to the outside of the switch cases 23 and 24.

<Front-Photographing Camera>

Figure 3:
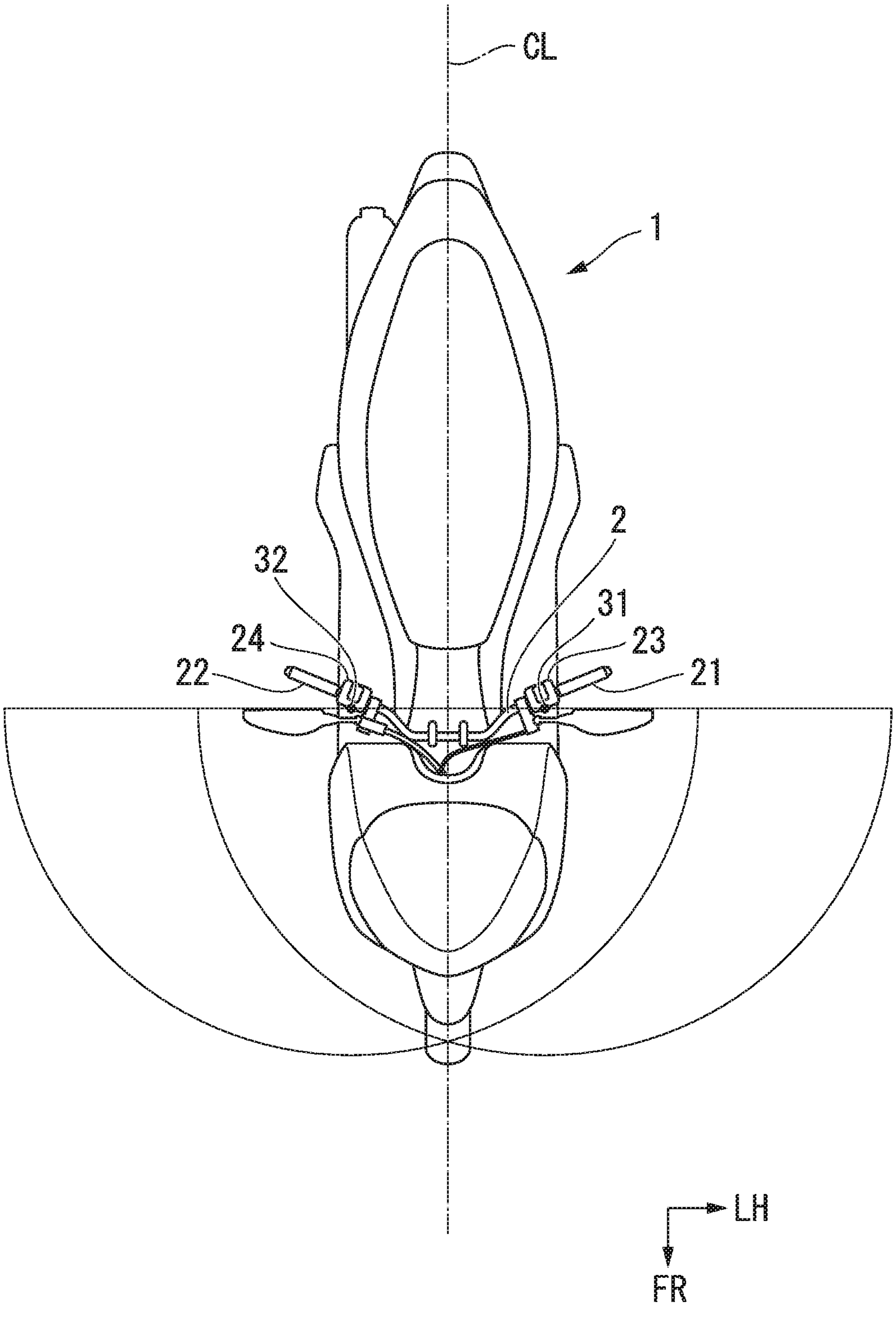
FIG. 3 is a view for describing photographing ranges of left and right front-photographing cameras according to the embodiment.

Referring to both FIG. 2 and FIG. 3, the left and right front-photographing cameras 31 and 32 are disposed at left and right symmetrical positions while having a vehicle body bilateral centerline CL in between. The left and right front-photographing cameras 31 and 32 constitute a stereo camera configured to photograph an object or the like in front of the vehicle from different viewpoints with each other. The driving support system 30 is capable of detecting an object or the like in front of the vehicle by photographing a front of the vehicle using the left and right front-photographing cameras 31 and 32. For example, the driving support system 30 is capable of performing an image synthesis based on the images photographed by the left and right front-photographing cameras 31 and 32, and detecting a stopped vehicle in front of the vehicle, a construction in front of the vehicle, an accident in front of the vehicle, a traffic sign in front of the vehicle, and so on.

When seen in the front view of FIG. 2, the left and right front-photographing cameras 31 and 32 are installed above the handle bar pipe 2. That is, the left and right front-photographing cameras 31 and 32 are disposed above an axis C1 of the handle bar pipe 2. The axis C1 of the handle bar pipe 2 coincides with central axes of the handle bar grips 21 and 22 having a tubular shape.

When seen in the front view of FIG. 2, the left front-photographing camera 31 is installed on the front upper section of the left switch case 23 on the outer side in the vehicle width direction. Specifically, when seen in a front view of FIG. 2, the left front-photographing camera 31 is disposed at an upper part than a clutch lever 13 and at more left side than the support stay 12*a* of the left rearview mirror 12L.

The lens 31*b* of the left front-photographing camera 31 is exposed toward the front side from the left switch case 23. That is, a member and the like that blocks a field of vision of the left front-photographing camera 31 is not disposed in front of the left front-photographing camera 31. For this reason, the left front-photographing camera 31 is capable of photographing an object or the like in front of the vehicle with a wide field of vision.

When seen in the front view of FIG. 2, the lens 31*b* of the left front-photographing camera 31 is formed in a circular shape. A visor section 31*c* formed in an arcuate shape along an outer circumference of the lens 31*b* when seen in the front view of FIG. 2 and configured to cover a front upper side of the lens 31*b* is formed on the left switch case 23.

When seen in the front view of FIG. 2, the right front-photographing camera 32 is installed on a front upper section of the right switch case 24 on the outer side in the vehicle width direction. Specifically, when seen in the front view of FIG. 2, the right front-photographing camera 32 is disposed at an upper part than a brake lever 14 and at more a right side than the support stay 12*a* of the right rearview mirror 12R.

The lens 32*b* of the right front-photographing camera 32 is exposed toward the front side from the right switch case 24. That is, a member or the like that blocks a field of vision of the right front-photographing camera 32 is not disposed in front of the right front-photographing camera 32. For this reason, the right front-photographing camera 32 is capable of photographing an object or the like in front of the vehicle with a wide field of vision.

When seen in the front view of FIG. 2, the lens 32*b* of the right front-photographing camera 32 is formed in a circular shape. An visor section 32*c* formed in an arcuate shape along an outer circumference of the lens 32*b* when seen in the front view of FIG. 2 and configured to cover a front upper side of the lens 32*b* is formed on the right switch case 24.

As shown in FIG. 3, photographing ranges of the left and right front-photographing cameras 31 and 32 are ranges in which an object or the like in front of the vehicle can be adequately photographed. When seen in the plan view of FIG. 3, a viewing angle (an angle of field) of the left and right front-photographing cameras 31 and 32 is substantially 180 degrees.

<Rear-Photographing Camera>

The rear-photographing cameras will be described with reference to both FIG. 4 and FIG. 5. The left and right rear-photographing cameras 33 and 34 are disposed at left and right symmetrical positions while having the vehicle body bilateral centerline CL in between. The left and right rear-photographing cameras 33 and 34 constitute a stereo camera configured to photograph an object or the like behind the vehicle from different viewpoints with each other. The driving support system 30 is capable of detecting an object or the like behind the vehicle by photographing a behind of the vehicle using the left and right rear-photographing cameras 33 and 34. For example, the driving support system 30 is capable of performing an image synthesis based on the images photographed by the left and right rear-photographing cameras 33 and 34, and detecting a state of a driver, a vehicle that approaches from behind of the vehicle, or the like.

Figure 4:
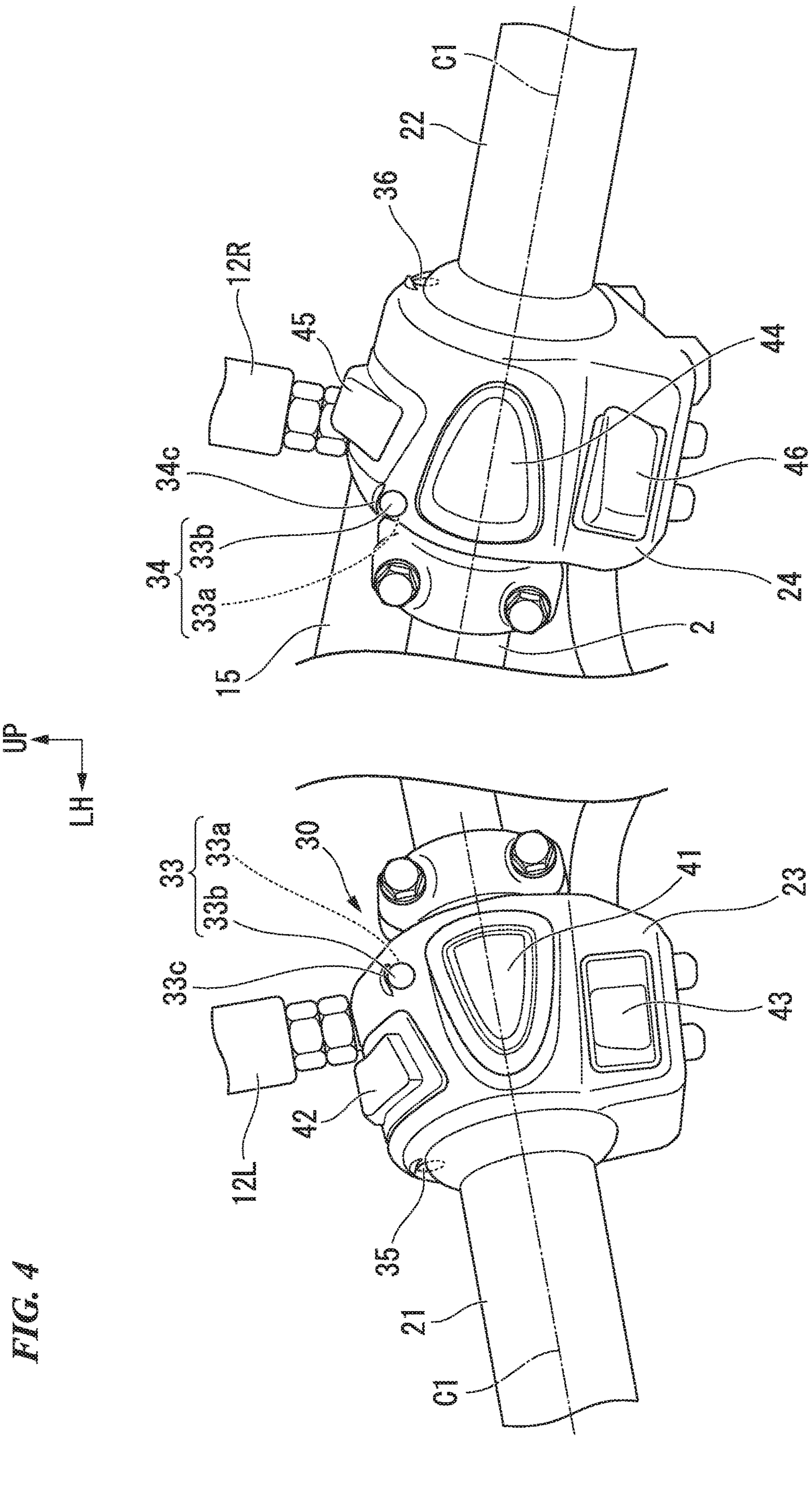
FIG. 4 is a rear view of the optical sensor disposition structure according to the embodiment.

When seen in a rear view of FIG. 4, the left and right rear-photographing cameras 33 and 34 are installed above the handle bar pipe 2. That is, the left and right rear-photographing cameras 33 and 34 are disposed at an upper part than the axis C1 of the handle bar pipe 2.

When seen in the rear view of FIG. 4, a horn switch 41 (a shaft section switch), a dimmer switch 42 (an upper switch) configured to switch between a high beam and a low beam, and a blinker switch 43 are installed on the left switch case 23.

When seen in the rear view of FIG. 4, the horn switch 41 is installed at a position overlapping the axis C1 of the handle bar pipe 2 (in other words, a central axis of a left handle bar grip 21). The dimmer switch 42 is installed on an upper section of the left switch case 23. The blinker switch 43 is installed on a lower section of the left switch case 23.

When seen in the rear view of FIG. 4, the left rear-photographing camera 33 is installed above the horn switch 41 and more inward than the dimmer switch 42 in the vehicle width direction. That is, the left rear-photographing camera 33 is installed on a rear upper section of the left switch case 23 on the inner side in the vehicle width direction.

The lens 33*b* of the left rear-photographing camera 33 is exposed toward the rear side from the left switch case 23. That is, a member or the like that blocks a field of vision of the left rear-photographing camera 33 is not disposed behind the left rear-photographing camera 33. For this reason, the left rear-photographing camera 33 is capable of photographing an object or the like behind the vehicle with a wide field of vision.

When seen in the rear view of FIG. 4, the lens 33*b* of the left rear-photographing camera 33 is formed in a circular shape. An visor section 33*c* formed in arcuate shape along an outer circumference of the lens 33*b* when seen in the rear view of FIG. 4 and configured to cover a rear upper side of the lens 33*b* is formed on the left switch case 23.

When seen in the rear view of FIG. 4, a hazard switch 44 (a shaft section switch), an emergency stop switch 45 (an upper switch) and a starter switch 46 are installed on the right switch case 24.

When seen in the rear view of FIG. 4, the hazard switch 44 is installed at a position overlapping the axis C1 of the handle bar pipe 2 (in other words, a central axis of a right handle bar grip 22). The emergency stop switch 45 is installed on an upper section of the right switch case 24. The starter switch 46 is installed on a lower section of the right switch case 24.

When seen in the rear view of FIG. 4, the right rear-photographing camera 34 is installed above the hazard switch 44 and more inward than the emergency stop switch 45 in the vehicle width direction. That is, the right rear-photographing camera 34 is installed on a rear upper section of the right switch case 24 on the inner side in the vehicle width direction.

The lens 34*b* of the right rear-photographing camera 34 is exposed toward the rear side from the right switch case 24. That is, a member or the like that blocks a field of vision of the right rear-photographing camera 34 is not disposed behind the right rear-photographing camera 34. For this reason, the right rear-photographing camera 34 is capable of photographing an object or the like behind the vehicle with a wide field of vision.

When seen in the rear view of FIG. 4, the lens 34*b* of the right rear-photographing camera 34 is formed in a circular shape. An visor section 34*c* formed in an arcuate shape along an outer circumference of the lens 34*b* when seen in the rear view of FIG. 4 and configured to cover a rear upper side of the lens 34*b* is formed on the right switch case 24.

Figure 5:
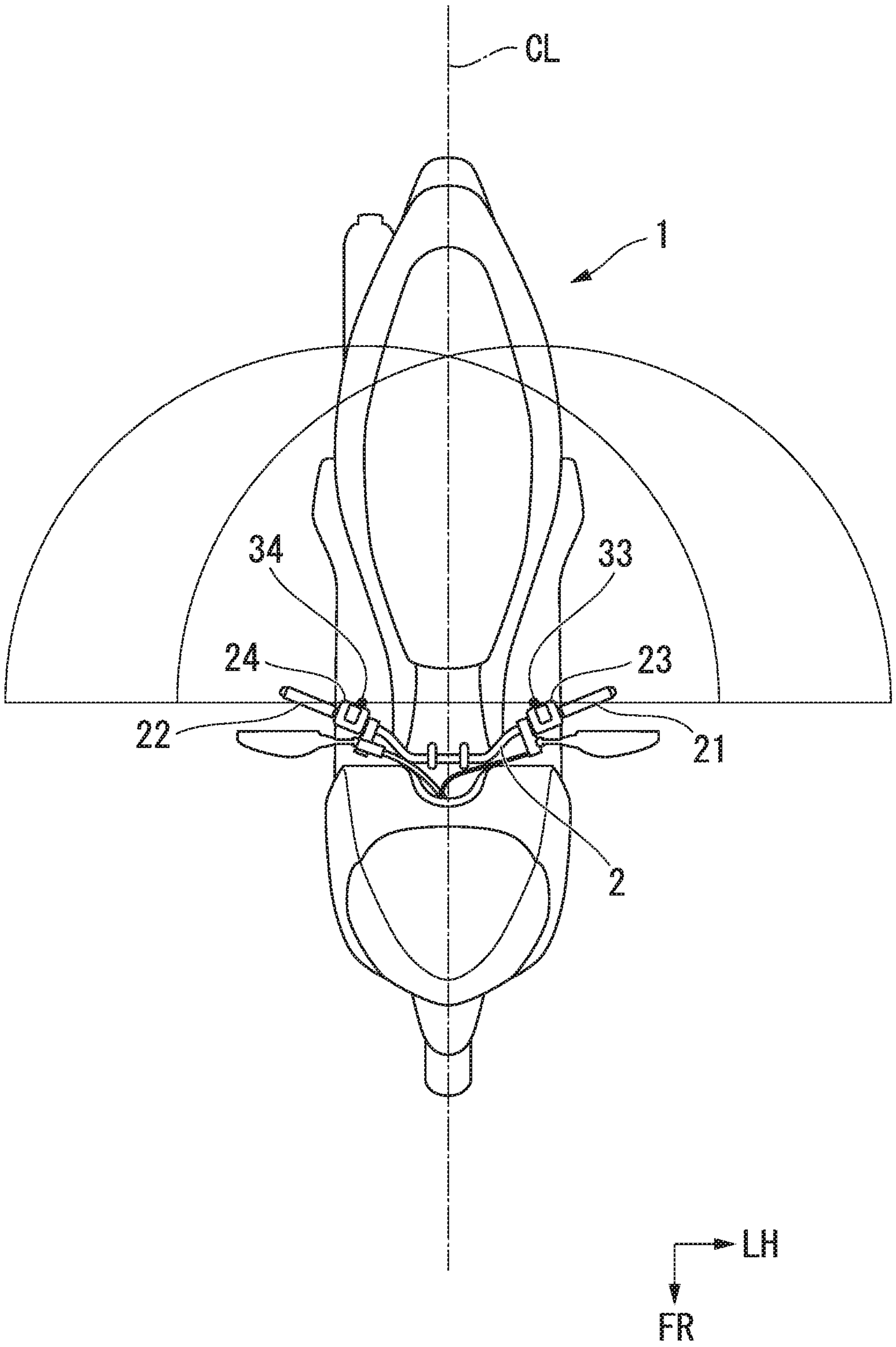
FIG. 5 is a view for describing photographing ranges of left and right rear-photographing cameras according to the embodiment.

As shown in FIG. 5, photographing ranges of the left and right rear-photographing cameras 33 and 34 are ranges in which an object or the like behind the vehicle can be adequately photographed. When seen in the plan view of FIG. 5, a viewing angle (an angle of field) of the left and right rear-photographing cameras 33 and 34 is substantially 180 degrees.

<Lateral-Photographing Camera>

The lateral-photographing cameras will be described with reference to all of FIG. 6 to FIG. 8. The left and right lateral-photographing cameras 35 and 36 are disposed at left and right symmetrical positions having the vehicle body bilateral centerline CL in between. The driving support system 30 is capable of detecting objects or the like on left and right sides of the vehicle by photographing the left and right sides of the vehicle using the left and right lateral-photographing cameras 35 and 36. For example, the driving support system 30 is capable of performing image synthesis based on the images photographed by the left and right lateral-photographing cameras 35 and 36, and detecting a vehicle beside the vehicle, a pedestrian beside the vehicle, a road beside the vehicle, an accident beside the vehicle, and so on.

Figure 6:
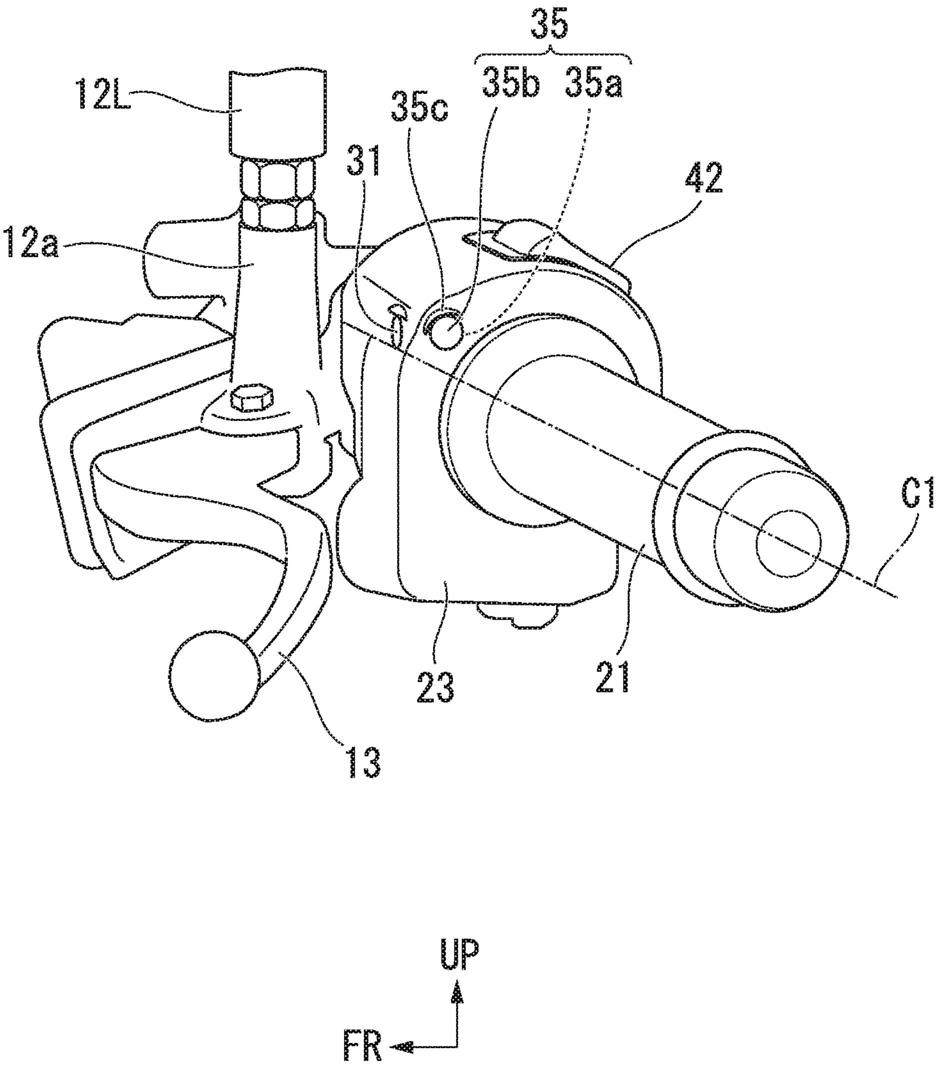
FIG. 6 is a left side view of the optical sensor disposition structure according to the embodiment.
Figure 7:
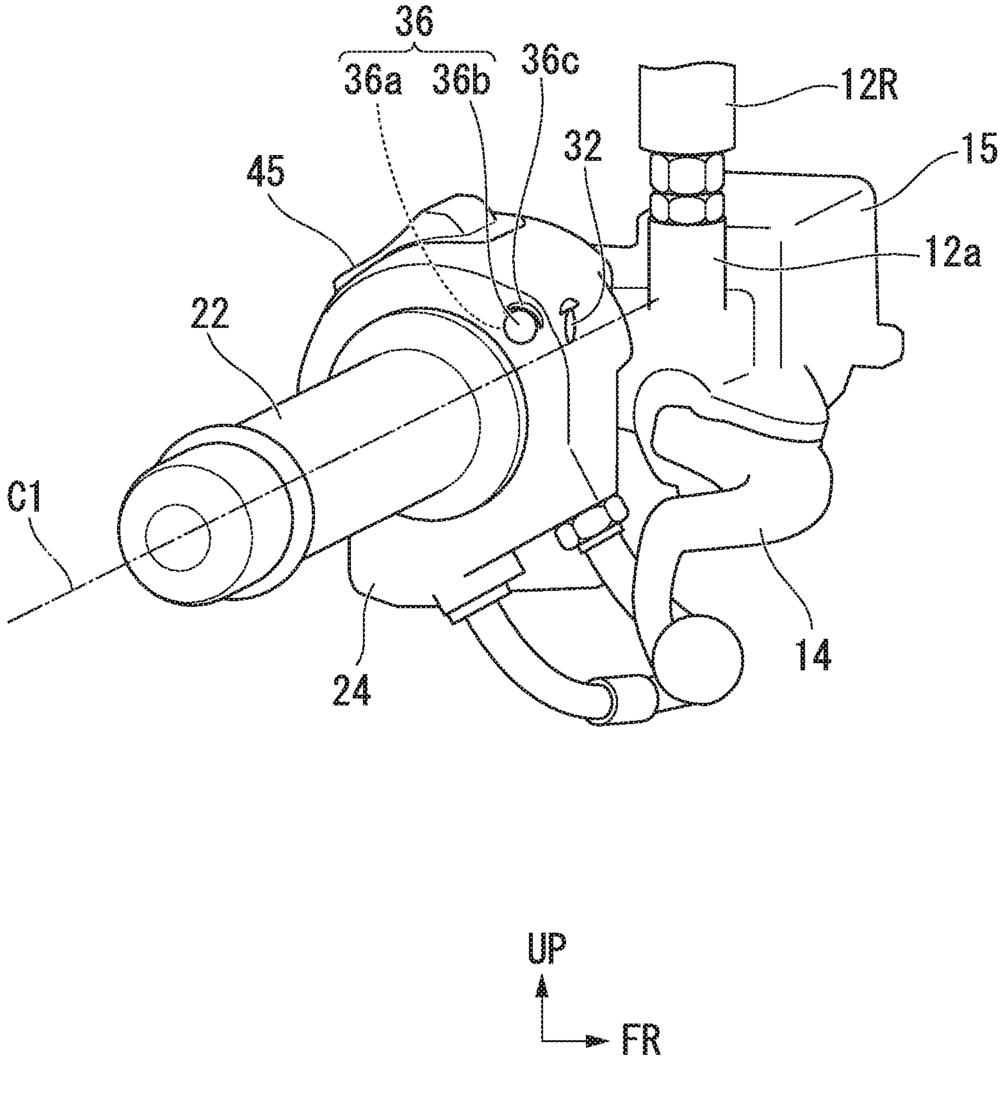
FIG. 7 is a right side view of the optical sensor disposition structure according to the embodiment.

When seen in the side views of FIG. 6 and FIG. 7, the left and right lateral-photographing cameras 35 and 36 are installed above the handle bar pipe 2 (see FIG. 4). That is, the left and right lateral-photographing cameras 35 and 36 are disposed above the axis C1 of the handle bar pipe 2. Hereinafter, the left lateral-photographing camera may be referred to as “a left photographing camera” and the right lateral-photographing camera may be referred to as “a right photographing camera.”

When seen in a left side view of FIG. 6, the left photographing camera 35 is installed on a front upper section of an outer end portion of the left switch case 23 in the vehicle width direction. Specifically, when seen in the left side view of FIG. 6, the left photographing camera 35 is disposed on a front upper side of the left handle bar grip 21, and disposed above the clutch lever 13 and behind the support stay 12*a* of the left rearview mirror 12L.

The lens 35*b* of the left photographing camera 35 is exposed toward the left side from the left switch case 23. That is, a member or the like that blocks a field of vision of the left photographing camera 35 is not disposed on the left side of the left photographing camera 35. For this reason, the left photographing camera 35 is capable of photographing an object or the like on the left side of the vehicle with a wide field of vision.

When seen in the left side view of FIG. 6, the lens 35*b* of the left photographing camera 35 is formed in a circular shape. An visor section 35*c* formed in an arcuate shape along an outer circumference of the lens 35*b* when seen in the left side view of FIG. 6 and configured to cover a left upper side of the lens 35*b* is formed on the left switch case 23.

When seen in the right side view of FIG. 7, the right photographing camera 36 is formed on a front upper section of an outer end portion of the right switch case 24 in the vehicle width direction. Specifically, when seen in the right side view of FIG. 7, the right photographing camera 36 is disposed on a front upper side of the right handle bar grip 22, and disposed above the brake lever 14 and behind the support stay 12*a* of the right rearview mirror 12R.

The lens 36*b* of the right photographing camera 36 is exposed toward the right side from the right switch case 24. That is, a member or the like that blocks a field of vision of the right photographing camera 36 is not disposed on a right side of the right photographing camera 36. For this reason, the right photographing camera 36 can photograph an object or the like on the right side of the vehicle with a wide field of vision.

When seen in the right side view of FIG. 7, the lens 36*b* of the right photographing camera 36 is formed in a circular shape. An visor section 36*c* formed in an arcuate shape along an outer circumference of the lens 36*b* when seen in the right side view of FIG. 7 and configured to cover a right upper side of the lens 36*b* is formed on the right switch case 24.

Figure 8:
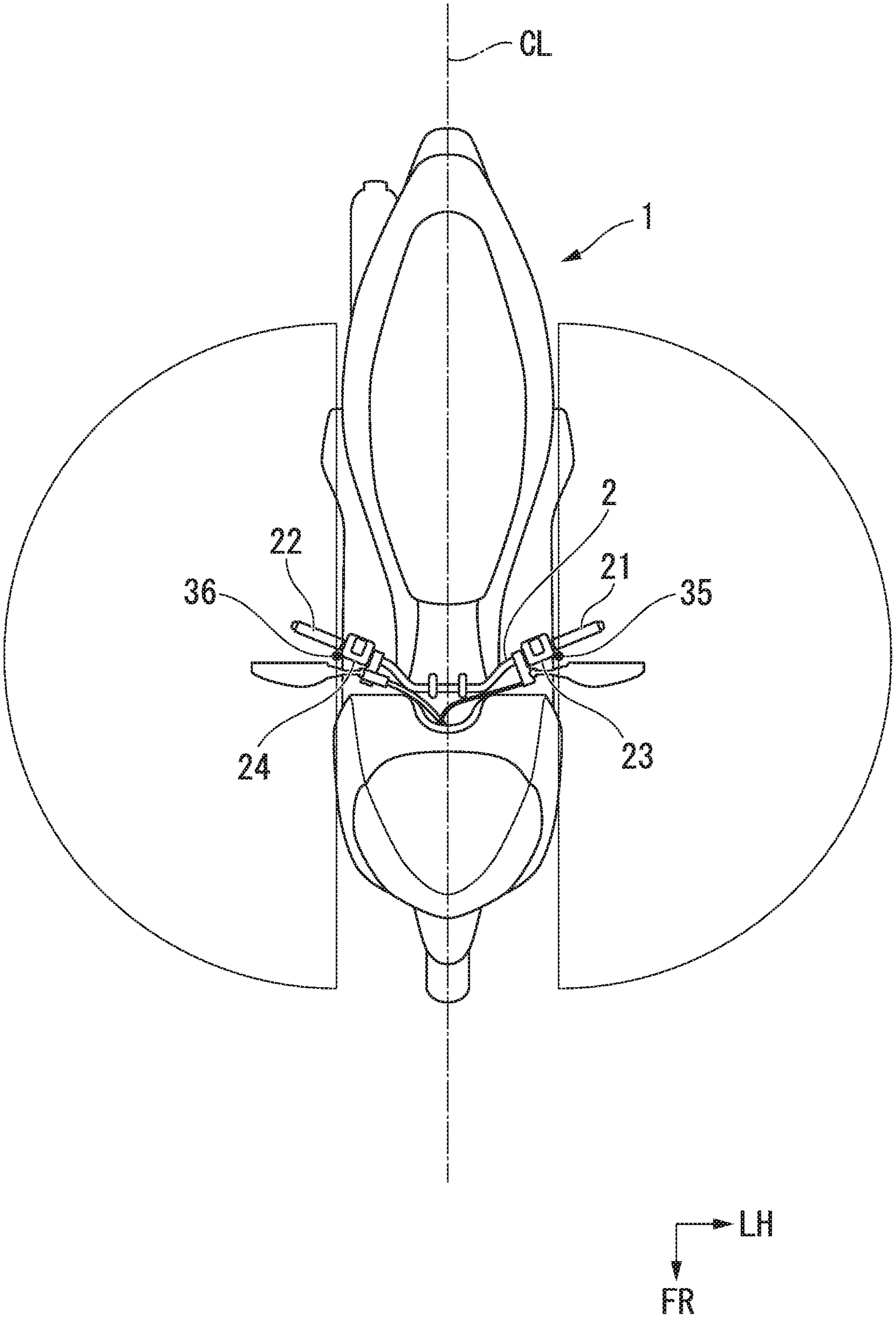
FIG. 8 is a view for describing photographing ranges of left and right lateral-photographing cameras according to the embodiment.

As shown in FIG. 8, photographing ranges of the left and right lateral-photographing cameras 35 and 36 are ranges in which objects or the like on left and right sides of the vehicle can be adequately photographed. When seen in a plan view of FIG. 8, a viewing angle (an angle of field) of the left and right lateral-photographing cameras 35 and 36 is substantially 180 degrees.

<Internal Structure of Left Switch Case>

Figure 9:
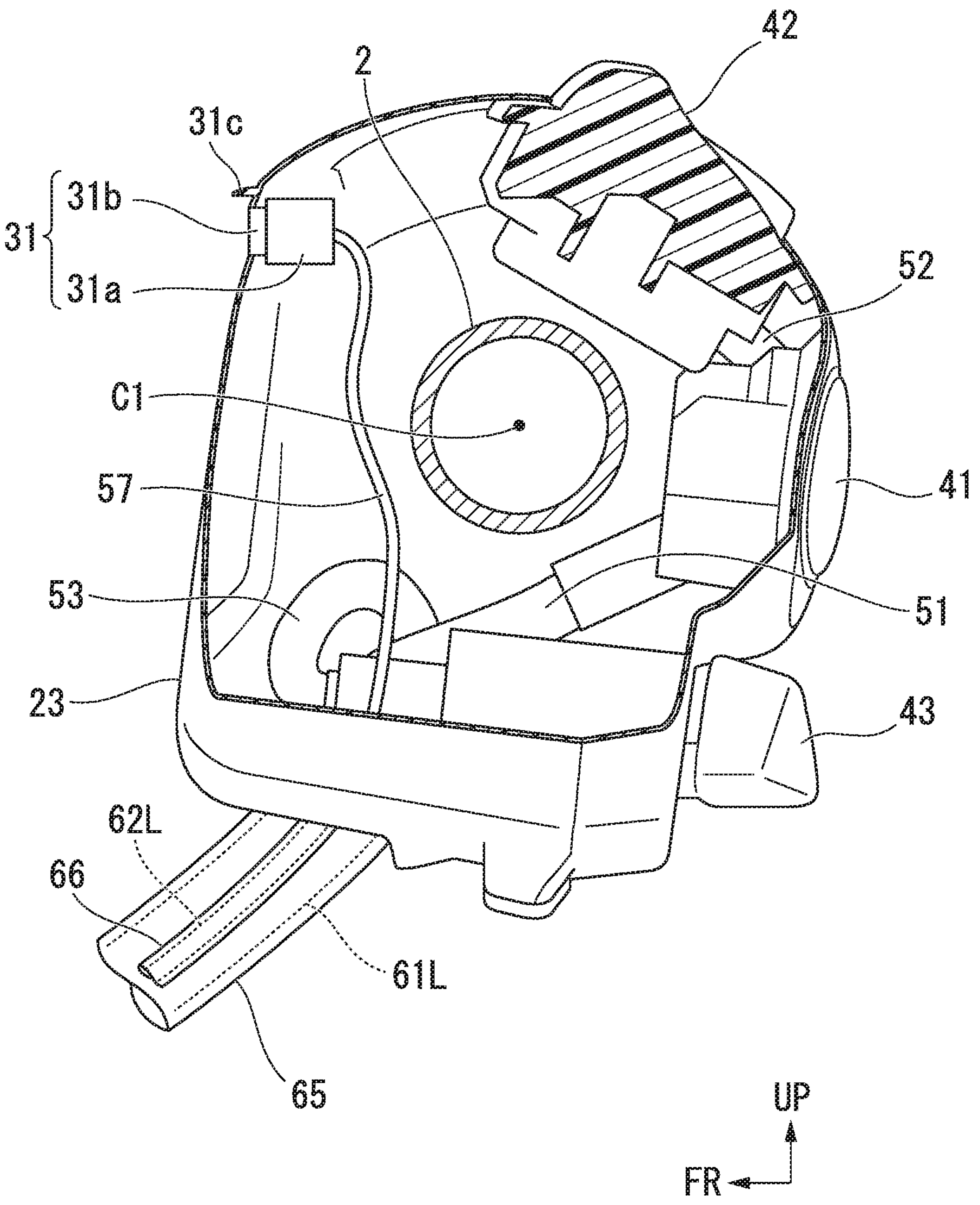
FIG. 9 is a view including a cross section taken along line IX-IX of FIG. 2.

FIG. 9 is a view including a cross section taken along line IX-IX of FIG. 2. That is, FIG. 9 is a view including a cross section obtained by cutting the left switch case 23 along a plane perpendicular to the axis C1 of the handle bar pipe 2.

When seen in a cross-sectional view of FIG. 9, the left switch case 23 is formed in an annular shape having an external shape larger than that of the handle bar pipe 2. A camera main body 31*a* of the left front-photographing camera 31 is installed inside the left switch case 23 and installed in front of the dimmer switch 42.

A horn switch harness 51 connected to the horn switch 41, a dimmer switch harness 52 connected to the dimmer switch 42, a blinker switch harness 53 connected to the blinker switch 43, a left front-photographing camera harness 57 connected to the left front-photographing camera 31, a left rear-photographing camera harness (not shown) connected to the left rear-photographing camera 33 (see FIG. 4), and a left lateral-photographing camera harness (not shown) connected to the left photographing camera 35 (see FIG. 4) are routed in a space around the handle bar pipe 2 inside the left switch case 23.

The horn switch harness 51, the dimmer switch harness 52 and the blinker switch harness 53 are bundled together to constitute a left switch harness 61L.

The left switch harness 61L is drawn outside from the left switch case 23, extends toward the vehicle body and is connected to a power supply unit (not shown). Reference numeral 65 in the drawings designates a tubular protective tube having flexibility and configured to cover the left switch harness 61L.

The left front-photographing camera harness 57, the left rear-photographing camera harness (not shown) and the left lateral-photographing camera harness (not shown) are bundled together to constitute a left camera harness 62L. The left camera harness 62L is drawn outside from the left switch case 23, extends toward the vehicle body along the left switch harness 61L and is connected to a power supply unit (not shown). Reference numeral 66 in the drawings designates a tubular protective tube having flexibility and configured to cover the left camera harness 62L.

<Internal Structure of Right Switch Case>

Figure 10:
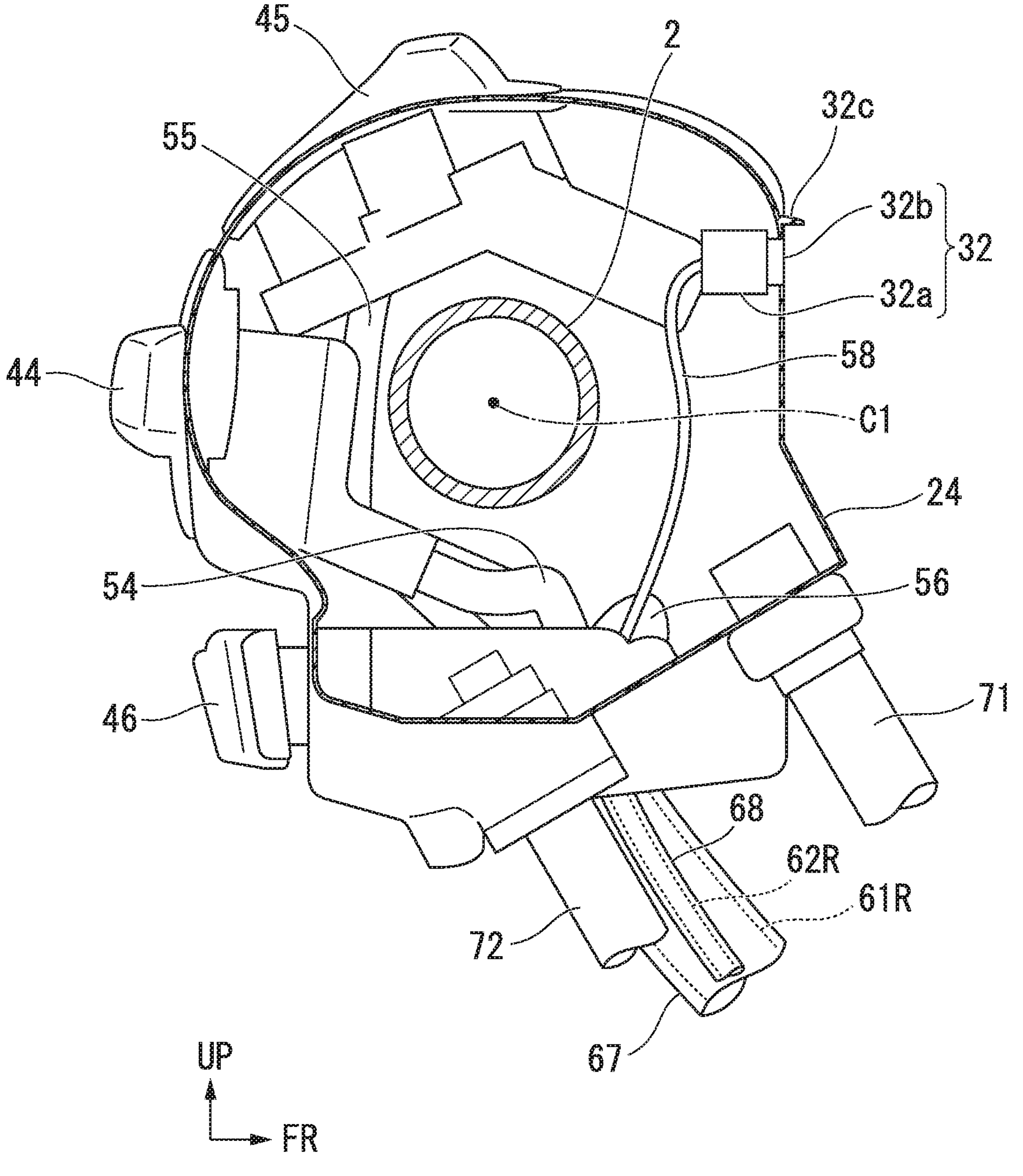
FIG. 10 is a view including a cross section taken along line X-X of FIG. 2.

FIG. 10 is a view including a cross section taken along line X-X of FIG. 2. That is, FIG. 10 is a view including a cross section obtained by cutting the right switch case 24 along a plane perpendicular to the axis C1 of the handle bar pipe 2.

When seen in a cross-sectional view of FIG. 10, the right switch case 24 is formed in an annular shape having an external shape larger than that of the handle bar pipe 2. The camera main body 32*a* of the right front-photographing camera 32 is installed inside of the right switch case 24 and installed in front of the emergency stop switch 45.

A hazard switch harness 54 connected to the hazard switch 44, an emergency stop switch harness 55 connected to the emergency stop switch 45, a starter switch harness 56 connected to the starter switch 46, a right front-photographing camera harness 58 connected to the right front-photographing camera 32, a right rear-photographing camera harness (not shown) connected to the right rear-photographing camera 34 (see FIG. 4), and a right lateral-photographing camera harness (not shown) connected to the right photographing camera 36 (see FIG. 4) are routed in a space around the handle bar pipe 2 inside the right switch case 24.

The hazard switch harness 54, the emergency stop switch harness 55 and the starter switch harness 56 are bundled together to constitute a right switch harness 61R. The right switch harness 61R is drawn outside of the right switch case 24, extends toward the vehicle body and is connected to a power supply unit (not shown). Reference numeral 67 in the drawings designates a tubular protective tube having flexibility and configured to cover the right switch harness 61R.

The right front-photographing camera harness 58, the right rear-photographing camera harness (not shown) and the right lateral-photographing camera harness (not shown) are bundled together to constitute a right camera harness 62R. The right camera harness 62R is drawn outside of the right switch case 24, extends toward the vehicle body along the right switch harness 61R and is connected to a power supply unit (not shown). Reference numeral 68 in the drawings designates a tubular protective tube having flexibility and configured to cover the right camera harness 62R. Further, reference numerals 71 and 72 in the drawings designate throttle cables.

<Surrounding Structure of Right Switch Case>

A surrounding structure of the right switch case will be described with reference to both FIG. 4 and FIG. 11. The right rear-photographing camera 34 is disposed in the vicinity of an inspection window 15*a* installed at a reservoir tank 15. Accordingly, in comparison with a case in which the right rear-photographing camera 34 is disposed at a position far from the inspection window 15*a*, since the right rear-photographing camera 34 can be inconspicuous, the appearance can be improved. Further, reference numeral 17 in the drawings designates a meter unit including gauges of various kinds and an information display unit, and reference numeral 18 in the drawings designates a leg shield.

As described above, the optical sensor disposition structure 20 of the motorcycle 1 of the embodiment includes the cameras 31, 32, 33, 34, 35 and 36, the left and right handle bar grips 21 and 22 installed on both side portions of the handle bar pipe 2, and the switch cases 23 and 24 installed between the left and right handle bar grips 21 and 22 and supported by the handle bar pipe 2, and the cameras 31, 32, 33, 34, 35 and 36 are installed at the switch cases 23 and 24.

According to the above-mentioned configuration, as the cameras 31, 32, 33, 34, 35 and 36 are installed at the switch cases 23 and 24, since a separate stay does not need to be fixed to the handle bar pipe 2, a periphery of the handle bar can be minimized. In addition, in comparison with the case in which a separate stay is installed, the appearance can be improved.

In addition, while the harnesses (for example, the left and right camera harnesses 62L and 62R) connected to the cameras 31, 32, 33, 34, 35 and 36 are necessary, in comparison with a case in which the cameras 31, 32, 33, 34, 35 and 36 are installed on a separate stay, routing distances of the harnesses 62L and 62R can be reduced.

In addition, since the harnesses 62L and 62R of the cameras 31, 32, 33, 34, 35 and 36 can be integrated with other harnesses (for example, the left and right switch harnesses 61L and 61R) of the switch cases 23 and 24, the appearance can be improved.

In addition, in comparison with a case in which a portable information terminal device having a built-in camera is installed, since a dead angle does not occur in a field of vision of an occupant due to the portable information terminal device, it is possible to prevent the meter unit 17 from being inconspicuous.

In addition, since the dead angle does not occur in detection regions of the cameras 31, 32, 33, 34, 35 and 36 due to vehicle parts such as the meter unit 17, the headlight 11, and so on, detectable ranges of the cameras 31, 32, 33, 34, 35 and 36 can be prevented from being restricted.

In addition, in the embodiment, as the cameras 31, 32, 33, 34, 35 and 36 include the camera main bodies 31*a*, 32*a*, 33*a*, 34*a*, 35*a* and 36*a* installed inside the switch cases 23 and 24, and the lenses 31*b*, 32*b*, 33*b*, 34*b*, 35*b* and 36*b* attached to the camera main bodies 31*a*, 32*a*, 33*a*, 34*a*, 35*a* and 36*a* and exposed to the outside of the switch cases 23 and 24, since the cameras 31, 32, 33, 34, 35 and 36 can be used even when raining, usability can be improved. In addition, since the camera main bodies 31*a*, 32*a*, 33*a*, 34*a*, 35*a* and 36*a* of the cameras 31, 32, 33, 34, 35 and 36 become inconspicuous, the appearance can be improved.

In addition, in the embodiment, as the cameras 31, 32, 33, 34, 35 and 36 are installed above the handle bar pipe 2, occurrence of the dead angle in the detection regions of the cameras 31, 32, 33, 34, 35 and 36 by the members around the handle bar can be suppressed. Accordingly, the detection regions of the cameras 31, 32, 33, 34, 35 and 36 can be secured.

In addition, in the embodiment, as the camera 33 is installed above the horn switch 41 and the camera 34 is installed above the hazard switch 44, even when an occupant operates the horn switch 41 or the hazard switch 44, the detection regions of the cameras 33 and 34 can be suppressed from being blocked by the occupant's hands. Accordingly, the detection regions of the cameras 33 and 34 can be secured.

In addition, in the embodiment, as the camera 33 is installed more inward than the dimmer switch 42 in the vehicle width direction and the camera 34 is installed more inward than the emergency stop switch 45 in the vehicle width direction, even when the occupant manipulates the dimmer switch 42 or the emergency stop switch 45, the detection regions of the cameras 33 and 34 can be suppressed from being blocked by the occupant's hands. Accordingly, the detection regions of the cameras 33 and 34 can be secured. In addition, in comparison with the case in which the camera 33 is installed more outward than the dimmer switch 42 in the vehicle width direction and the camera 34 is installed more outward than the emergency stop switch 45 in the vehicle width direction, routing distances of the harnesses connected to the cameras 33 and 34 can be reduced.

Further, in the embodiment, while the example in which the left and right front-photographing cameras, the left and right rear-photographing cameras and the left and right lateral-photographing cameras are installed in the switch case has been exemplarily described, there is no limitation thereto.

For example, only the left and right front-photographing cameras may be installed in the switch case. That is, at least one of the left and right front-photographing camera, the left and right rear-photographing camera, and the left and right lateral-photographing camera may be installed in the switch case.

In addition, in the embodiment, while the example in which the right rear-photographing camera is disposed in the vicinity of the inspection window installed on the reservoir tank has been exemplarily described, there is no limitation thereto.

For example, when a clutch master cylinder is installed, the left rear-photographing camera may be disposed in the vicinity of the inspection window installed on the reservoir tank of the clutch master cylinder. Even in this case, since the left rear-photographing camera can be inconspicuous, the appearance can be improved.

In addition, in the embodiment, while the example in which the camera includes the camera main body installed inside the switch case has been exemplarily described, there is no limitation thereto.

For example, the camera may include a camera main body exposed on the outside of the switch case. Even in this case, when the camera main body and the switch case have substantially the same color (for example, black), since the camera is inconspicuous, the appearance can be improved.

Further, the present invention is not limited to the embodiment and, for example, the camera may be a camera configured to capture invisible light such as infrared light or the like in addition to visible light. In addition to the camera, an optical sensor such as a radar or the like using infrared light, millimeter waves, or the like, may be provided. A configuration using a single optical sensor rather than a pair of left and right optical sensors may be provided. A configuration in which the camera and the radar are combined may be provided. The disposition of lenses of the cameras in the embodiment is a disposition of antennae in the case of radar.

All vehicles in which a driver rides across the vehicle body are included as the saddle riding vehicle, and in addition to a motorcycle (including a motorized bicycle and a scooter type vehicle), a three-wheeled vehicle (including a two-front-wheeled and one-rear-wheeled vehicle in addition to a one-front-wheeled and two-rear-wheeled vehicle) are also included.

While preferred embodiments of the invention have been described and illustrated above, it should be understood that these are exemplary of the invention and are not to be considered as limiting. Additions, omissions, substitutions, and other modifications can be made without departing from the scope of the present invention.

What is claimed is:

1. An optical sensor disposition structure for a saddle riding vehicle including a handle bar, the optical sensor disposition structure comprising:

a plurality of left optical sensors;

a plurality of right optical sensors;

a left handle bar grip installed on a left side portion of the handle bar;

a right handle bar grip installed on a right side portion of the handle bar; and a left switch case installed on the left handle bar grip and supported by the left handle bar grip;

wherein the plurality of left optical sensors is installed on the left switch case and the plurality of left optical sensors include a left forward detecting sensor configured to detect a forward side of the vehicle, a left rearward detecting sensor configured to detect a rearward side of the vehicle and a left lateral detecting sensor configured to detect a left lateral side of the vehicle;

a right switch case installed on the right handle bar grip and supported by the right handle bar grip, wherein the plurality of right optical sensors is installed on the right switch case and the plurality of right optical sensors include a right forward detecting sensor configured to detect a forward side of the vehicle, a rearward detecting sensor configured to detect a rearward side of the vehicle and a right lateral detecting sensor configured to detect a right lateral side of the vehicle.

2. The optical sensor disposition structure for a saddle riding vehicle according to claim 1, wherein each of the plurality of left optical sensors comprises:

a main body section installed inside the left switch case; and a lens attached to the main body section and exposed toward an outside of the left switch case, and wherein each of the plurality of right optical sensors comprises:

a main body section installed inside the right switch case; and a lens attached to the main body section and exposed toward an outside of the right switch case.

3. The optical sensor disposition structure for a saddle riding vehicle according to claim 1, wherein each of the plurality of left and right optical sensors is installed above the handle bar.

4. The optical sensor disposition structure for a saddle riding vehicle according to claim 2, wherein each of the plurality of left and right optical sensors is installed above the handle bar.

5. The optical sensor disposition structure for a saddle riding vehicle according to claim 1, wherein, when seen in a rear view, a shaft section switch is installed at a position overlapping an axis of the handle bar, and the left and rearward detecting sensors are installed above the shaft section switch.

6. The optical sensor disposition structure for a saddle riding vehicle according to claim 2, wherein, when seen in a rear view, a shaft section switch is installed at a position overlapping an axis of the handle bar, and the left and rearward detecting sensors are installed above the shaft section switch.

7. The optical sensor disposition structure for a saddle riding vehicle according to claim 3, wherein, when seen in a rear view, a shaft section switch is installed at a position overlapping an axis of the handle bar, and the left and rearward detecting sensors are installed above the shaft section switch.

8. The optical sensor disposition structure for a saddle riding vehicle according to claim 4, wherein, when seen in a rear view, a shaft section switch is installed at a position overlapping an axis of the handle bar, and the left and rearward detecting sensors are installed above the shaft section switch.

9. The optical sensor disposition structure for a saddle riding vehicle according to claim 1, wherein, when seen in a rear view, an upper switch is installed at an upper section of the switch case, and the left and rearward detecting sensors are installed more inward than the upper switch in a vehicle width direction.

10. The optical sensor disposition structure for a saddle riding vehicle according to claim 2, wherein, when seen in a rear view, an upper switch is installed at an upper section of the switch case, and the left and rearward detecting sensors are installed more inward than the upper switch in a vehicle width direction.

11. The optical sensor disposition structure for a saddle riding vehicle according to claim 3, wherein, when seen in a rear view, an upper switch is installed at an upper section of the switch case, and the left and rearward detecting sensors are installed more inward than the upper switch in a vehicle width direction.

12. The optical sensor disposition structure for a saddle riding vehicle according to claim 4, wherein, when seen in a rear view, an upper switch is installed at an upper section of the switch case, and the left and rearward detecting sensors are installed more inward than the upper switch in a vehicle width direction.

13. The optical sensor disposition structure for a saddle riding vehicle according to claim 5, wherein, when seen in a rear view, an upper switch is installed at an upper section of the switch case, and the left and rearward detecting sensors are installed more inward than the upper switch in a vehicle width direction.

14. The optical sensor disposition structure for a saddle riding vehicle according to claim 6, wherein, when seen in a rear view, an upper switch is installed at an upper section of the switch case, and the left and rearward detecting sensors are installed more inward than the upper switch in a vehicle width direction.

15. The optical sensor disposition structure for a saddle riding vehicle according to claim 7, wherein, when seen in a rear view, an upper switch is installed at an upper section of the switch case, and the left and rearward detecting sensors are installed more inward than the upper switch in a vehicle width direction.

16. The optical sensor disposition structure for a saddle riding vehicle according to claim 8, wherein, when seen in a rear view, an upper switch is installed at an upper section of the switch case, and the left and rearward detecting sensors are installed more inward than the upper switch in a vehicle width direction.

* * * * *